United States Patent
Chiang et al.

(10) Patent No.: US 11,632,231 B2
(45) Date of Patent: Apr. 18, 2023

(54) SUBSTITUTE BOX, SUBSTITUTE METHOD AND APPARATUS THEREOF

(71) Applicant: NOVATEK Microelectronics Corp., Hsin-Chu (TW)

(72) Inventors: Wei Chiang, Taipei (TW); Hsi-Chia Chang, Hsinchu (TW); Chen-Yi Lee, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 450 days.

(21) Appl. No.: 16/809,567

(22) Filed: Mar. 5, 2020

(65) Prior Publication Data

US 2021/0281390 A1 Sep. 9, 2021

(51) Int. Cl.
| | | |
|---|---|---|
| *H04L 9/08* | (2006.01) | |
| *H04L 9/00* | (2022.01) | |
| *G06F 21/75* | (2013.01) | |
| *G06F 7/58* | (2006.01) | |
| *G06F 21/72* | (2013.01) | |

(52) U.S. Cl.
CPC .............. *H04L 9/003* (2013.01); *G06F 7/588* (2013.01); *G06F 21/72* (2013.01); *G06F 21/755* (2017.08); *H04L 9/0869* (2013.01); *G06F 2207/7223* (2013.01); *H04L 2209/08* (2013.01); *H04L 2209/16* (2013.01)

(58) Field of Classification Search
CPC ... H04L 9/003; H04L 9/0869; H04L 2209/08; H04L 2209/16; H04L 9/0618; H04L 9/0631; G06F 7/588; G06F 21/72; G06F 21/755; G06F 2207/7223
See application file for complete search history.

(56) References Cited

U.S. PATENT DOCUMENTS

| | | | | |
|---|---|---|---|---|
| 7,508,937 B2* | 3/2009 | Stein | ...................... | H04L 9/0631 380/37 |
| 7,639,800 B2* | 12/2009 | Kasuya | ..................... | G09C 1/00 380/37 |
| 7,822,196 B2* | 10/2010 | Matsui | .................. | H04L 9/0625 380/28 |
| 8,102,997 B2* | 1/2012 | Teglia | ..................... | H04L 9/003 380/37 |
| 8,577,025 B2* | 11/2013 | Fumaroli | .............. | G06F 21/755 380/28 |

(Continued)

OTHER PUBLICATIONS

Werner et al., Implementing Authenticated Encryption Algorithm MK-3 on FPGA, IEEE, 2016.*

(Continued)

*Primary Examiner* — David Garcia Cervetti

(74) *Attorney, Agent, or Firm* — Winston Hsu

(57) ABSTRACT

A substitute box includes a target input terminal, an obfuscation input terminal, a first output terminal and a second output terminal. The target input terminal is configured to receive a target input data. The obfuscation input terminal is configured to receive an obfuscation input data unrelated to a plaintext. The first output terminal is configured to output a first output data. The second output terminal is configured to output a second output data associated with the first output data. The first output data and the second output data are generated according to both the target input data and the obfuscation input data.

20 Claims, 5 Drawing Sheets

(56) References Cited

U.S. PATENT DOCUMENTS

| | | | | |
|---|---|---|---|---|
| 8,774,402 B2* | 7/2014 | Jung | | H04L 9/0631 |
| | | | | 713/189 |
| 8,966,279 B2* | 2/2015 | Farrugia | | H04L 9/002 |
| | | | | 713/189 |
| 9,031,228 B2* | 5/2015 | Ciet | | H04L 9/0631 |
| | | | | 380/28 |
| 9,189,425 B2* | 11/2015 | Farrugia | | H04L 9/0631 |
| 9,331,848 B1* | 5/2016 | Pedersen | | H04L 9/0637 |
| 10,320,554 B1* | 6/2019 | Pedersen | | H04L 9/003 |
| 11,258,579 B2* | 2/2022 | Fronte | | H04L 9/003 |
| 11,386,239 B2* | 7/2022 | Pulkus | | G06F 21/755 |
| 2005/0207571 A1* | 9/2005 | Ahn | | H04L 9/003 |
| | | | | 380/28 |
| 2006/0123325 A1* | 6/2006 | Wilson | | G06F 7/724 |
| | | | | 714/781 |
| 2007/0255941 A1* | 11/2007 | Ellis | | H04L 9/0662 |
| | | | | 713/151 |
| 2008/0260145 A1* | 10/2008 | Trichina | | H04L 9/003 |
| | | | | 380/46 |
| 2008/0285745 A1* | 11/2008 | Teglia | | H04L 9/0631 |
| | | | | 380/29 |
| 2009/0086976 A1* | 4/2009 | Scian | | H04L 9/003 |
| | | | | 380/28 |
| 2010/0054460 A1* | 3/2010 | Martinez | | H04L 9/004 |
| | | | | 380/28 |
| 2010/0086126 A1* | 4/2010 | Yokota | | H04L 9/003 |
| | | | | 708/250 |
| 2011/0013767 A1* | 1/2011 | Kim | | H04L 9/0618 |
| | | | | 380/28 |
| 2011/0268266 A1* | 11/2011 | Fujisaki | | H04L 9/003 |
| | | | | 380/28 |
| 2012/0093313 A1* | 4/2012 | Michiels | | G09C 1/00 |
| | | | | 380/255 |
| 2012/0254625 A1* | 10/2012 | Farrugia | | G06F 21/52 |
| | | | | 713/189 |
| 2012/0294439 A1* | 11/2012 | Choi | | G06F 21/755 |
| | | | | 380/28 |
| 2013/0236005 A1* | 9/2013 | Ikeda | | H04L 9/003 |
| | | | | 380/28 |
| 2014/0321638 A1* | 10/2014 | Weyna | | G09C 1/00 |
| | | | | 380/28 |
| 2015/0043731 A1* | 2/2015 | Lee | | H04L 9/0631 |
| | | | | 380/42 |
| 2015/0067302 A1* | 3/2015 | Gueron | | G06F 9/3887 |
| | | | | 712/210 |
| 2015/0086007 A1* | 3/2015 | Mathew | | H04L 9/0631 |
| | | | | 380/28 |
| 2015/0222423 A1* | 8/2015 | Pepin | | H04L 9/0631 |
| | | | | 713/189 |
| 2015/0244524 A1* | 8/2015 | Pulkus | | G06F 16/2282 |
| | | | | 380/28 |
| 2015/0278555 A1* | 10/2015 | Melzani | | H04L 9/002 |
| | | | | 713/192 |
| 2015/0312039 A1* | 10/2015 | Michiels | | H04L 9/3231 |
| | | | | 713/186 |
| 2015/0312042 A1* | 10/2015 | Michiels | | H04L 9/3242 |
| | | | | 380/28 |
| 2015/0312223 A1* | 10/2015 | Michiels | | G06F 21/51 |
| | | | | 713/168 |
| 2015/0312224 A1* | 10/2015 | Michiels | | H04L 9/0631 |
| | | | | 713/168 |
| 2015/0312226 A1* | 10/2015 | Michiels | | H04L 63/123 |
| | | | | 713/168 |
| 2015/0349951 A1* | 12/2015 | Farrugia | | G06F 9/30007 |
| | | | | 380/28 |
| 2016/0048689 A1* | 2/2016 | Wiener | | G06F 21/602 |
| | | | | 713/189 |
| 2016/0050065 A1* | 2/2016 | Michiels | | H04L 9/0618 |
| | | | | 380/28 |
| 2016/0065361 A1* | 3/2016 | Choi | | H04L 9/0631 |
| | | | | 380/287 |
| 2016/0182227 A1* | 6/2016 | Michiels | | H04L 9/0838 |
| | | | | 380/28 |
| 2016/0269175 A1* | 9/2016 | Cammarota | | H04L 9/002 |
| 2016/0350520 A1* | 12/2016 | Michiels | | G06F 21/14 |
| 2017/0033921 A1* | 2/2017 | Michiels | | G06F 21/14 |
| 2017/0063522 A1* | 3/2017 | Bruneau | | H04L 9/0631 |
| 2017/0063523 A1* | 3/2017 | Bruneau | | G09C 1/00 |
| 2017/0063524 A1* | 3/2017 | Bruneau | | G09C 1/00 |
| 2017/0104586 A1* | 4/2017 | Hars | | H04L 9/003 |
| 2017/0141911 A1* | 5/2017 | Michiels | | H04L 9/003 |
| 2017/0180119 A1* | 6/2017 | Michiels | | H04L 9/14 |
| 2017/0195117 A1* | 7/2017 | Wu | | G09C 1/00 |
| 2017/0324542 A1* | 11/2017 | Drexler | | H04L 9/0618 |
| 2017/0353302 A1* | 12/2017 | Fernandez | | H04L 9/16 |
| 2017/0366339 A1* | 12/2017 | Noura | | H04L 9/0618 |
| 2017/0373836 A1* | 12/2017 | Rarick | | H04L 9/0861 |
| 2017/0373838 A1* | 12/2017 | Wurcker | | H04L 9/002 |
| 2018/0062829 A1* | 3/2018 | Suresh | | H04L 9/0637 |
| 2018/0062830 A1* | 3/2018 | Baker | | G06F 21/556 |
| 2018/0097618 A1* | 4/2018 | Kumar | | H04L 9/003 |
| 2018/0183576 A1* | 6/2018 | Wang | | H04L 9/0631 |
| 2018/0248682 A1* | 8/2018 | Nguyen | | H04L 9/002 |
| 2019/0044699 A1* | 2/2019 | Satpathy | | H04L 9/0618 |
| 2019/0116023 A1* | 4/2019 | Kumar | | H04L 9/0662 |
| 2019/0132116 A1* | 5/2019 | Michiels | | H04L 9/14 |
| 2019/0199517 A1* | 6/2019 | Satpathy | | H04L 9/065 |
| 2019/0245679 A1* | 8/2019 | Suresh | | G09C 1/00 |
| 2019/0287427 A1* | 9/2019 | Schepers | | H04L 9/0631 |
| 2019/0372753 A1* | 12/2019 | Dorrendorf | | G09C 1/00 |
| 2019/0386815 A1* | 12/2019 | Satpathy | | G06F 7/724 |
| 2020/0099510 A1* | 3/2020 | Mao | | H04L 9/14 |
| 2020/0313850 A1* | 10/2020 | Lin | | G06F 16/9017 |
| 2020/0328877 A1* | 10/2020 | Muthineni | | H04L 9/0631 |
| 2020/0403802 A1* | 12/2020 | Hars | | H04L 9/3242 |
| 2020/0412523 A1* | 12/2020 | Tunstall | | G06F 21/755 |
| 2021/0026994 A1* | 1/2021 | Tehranipoor | | G06F 30/343 |
| 2021/0050991 A1* | 2/2021 | Yu | | H04L 9/0637 |
| 2021/0135842 A1* | 5/2021 | Takatsukasa | | H04L 9/0637 |
| 2021/0152329 A1* | 5/2021 | Subbumurugesan | | G06F 17/16 |
| 2022/0278822 A1* | 9/2022 | Ekdahl | | H04L 9/0631 |

OTHER PUBLICATIONS

Jayasinghe et al., QuadSeal: Quadruple Algorithmic Symmetrizing Countermeasure Against Power Based Sidechannel Attacks, IEEE, 2015.*

* cited by examiner

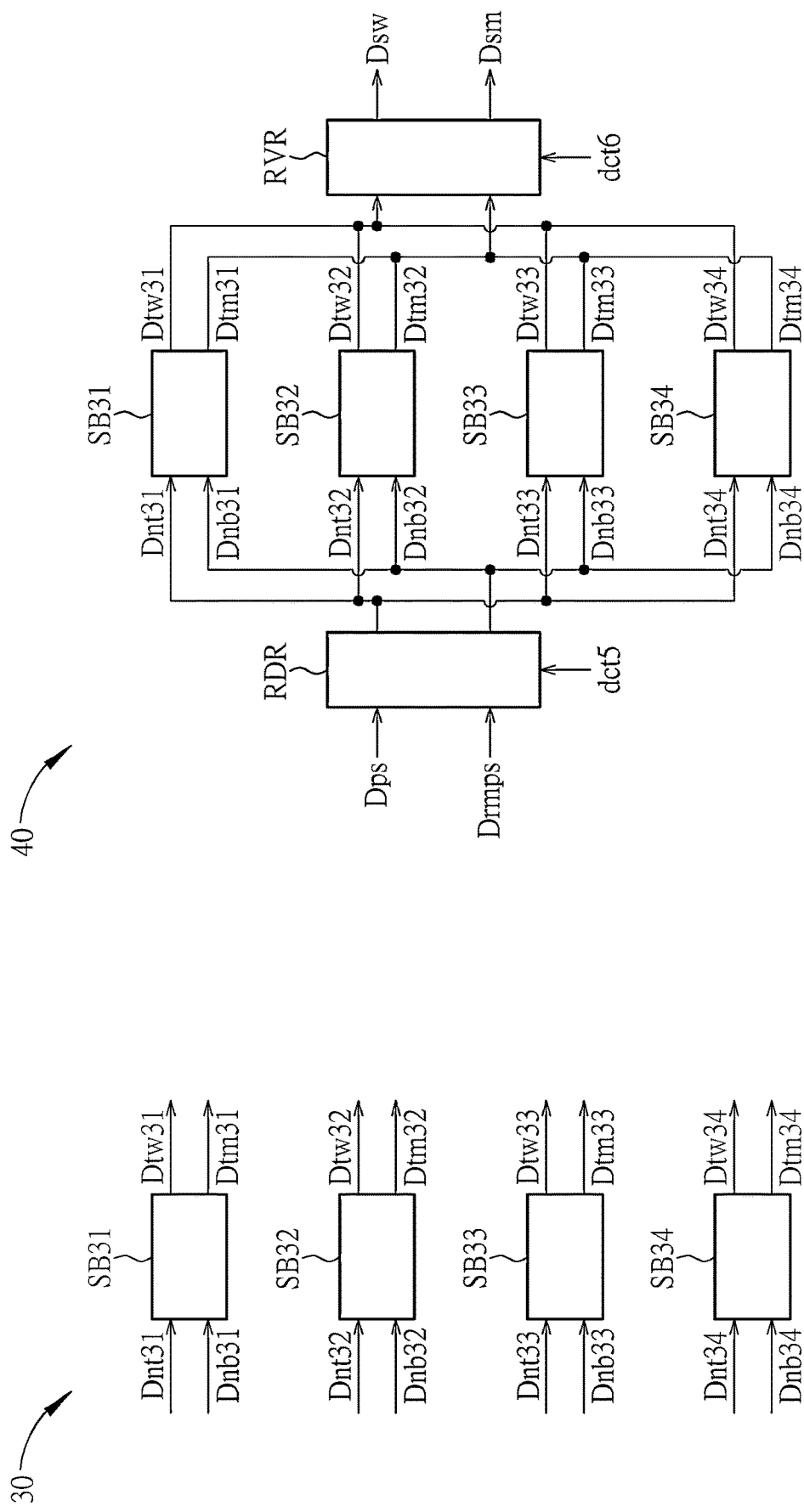

SUBSTITUTE BOX, SUBSTITUTE METHOD AND APPARATUS THEREOF

BACKGROUND OF THE INVENTION

1. Field of the Invention

The present invention relates to a substitute box, a substitute method and an apparatus, and more particularly, to a substitute box, a substitute method and an apparatus for protection against side channel attacks.

2. Description of the Prior Art

SM4 is a block cipher that generates a 128-bit output from a 128-bit input and a 128-bit key after 32 nonlinear rounds. It has a concise structure and each round has a few XOR operations, a nonlinear substitution and a linear transformation. Encryption and decryption have the same structure except that the order of round key (data) for decryption is reversed. Key expansion has a similar structure to encryption and uses the same nonlinear substitution.

An SM4 hardware architecture is commonly used for 32 rounds of encryption. From the SM4 hardware architecture, it is found that when input pattern of the 128-bit input is unchanged, intermediate values in the SM4 hardware architecture would be exactly the same. Consequently, power consumption of the SM4 hardware architecture is similar and predictable. Because finding the correlation between power consumption and the input pattern of the 128-bit input is easy and possible by means of side channel attack, the 128-bit key for encryption is vulnerable. As a result, there is a need for an improvement.

SUMMARY OF THE INVENTION

Therefore, the present invention primarily provides to a substitute box, a substitute method and an apparatus for protection against side channel attacks.

An embodiment of the present application includes a substitute box. The substitute box includes a target input terminal, an obfuscation input terminal, a first output terminal and a second output terminal. The target input terminal is configured to receive a target input data. The obfuscation input terminal is configured to receive an obfuscation input data unrelated to a plaintext. The first output terminal is configured to output a first output data. The second output terminal is configured to output a second output data associated with the first output data. The first output data and the second output data are generated according to both the target input data and the obfuscation input data.

An embodiment of the present application includes an apparatus. The apparatus includes four substitute boxes. Each of the four substitute boxes includes a target input terminal, an obfuscation input terminal, a first output terminal and a second output terminal. The target input terminal is configured to receive a target input data. The obfuscation input terminal is configured to receive an obfuscation input data unrelated to a plaintext. The first output terminal is configured to output a first output data. The second output terminal is configured to output a second output data associated with the first output data. The first output data and the second output data are generated according to both the target input data and the obfuscation input data.

An embodiment of the present application includes a substitute method. The substitute method includes receiving one of four target input data and one of four obfuscation input data unrelated to a plaintext; and generating one of four first output data and one of four second output data associated with the first output data. The first output data and the second output data are generated according to both the target input data and the obfuscation input data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 to FIG. 5 are schematic diagrams of apparatuses according to an embodiment of the present invention.

DETAILED DESCRIPTION

In the following description and claims, the terms "include" and "comprise" are used in an open-ended fashion, and thus should be interpreted to mean "include, but not limited to". Also, the term "couple" is intended to mean either an indirect or direct electrical connection. Use of ordinal terms such as "first" and "second" does not by itself connote any priority, precedence, or order of one element over another or the temporal order in which acts of a method are performed, but are used merely as labels to distinguish one element having a certain name from another element having the same name.

Figure 2:
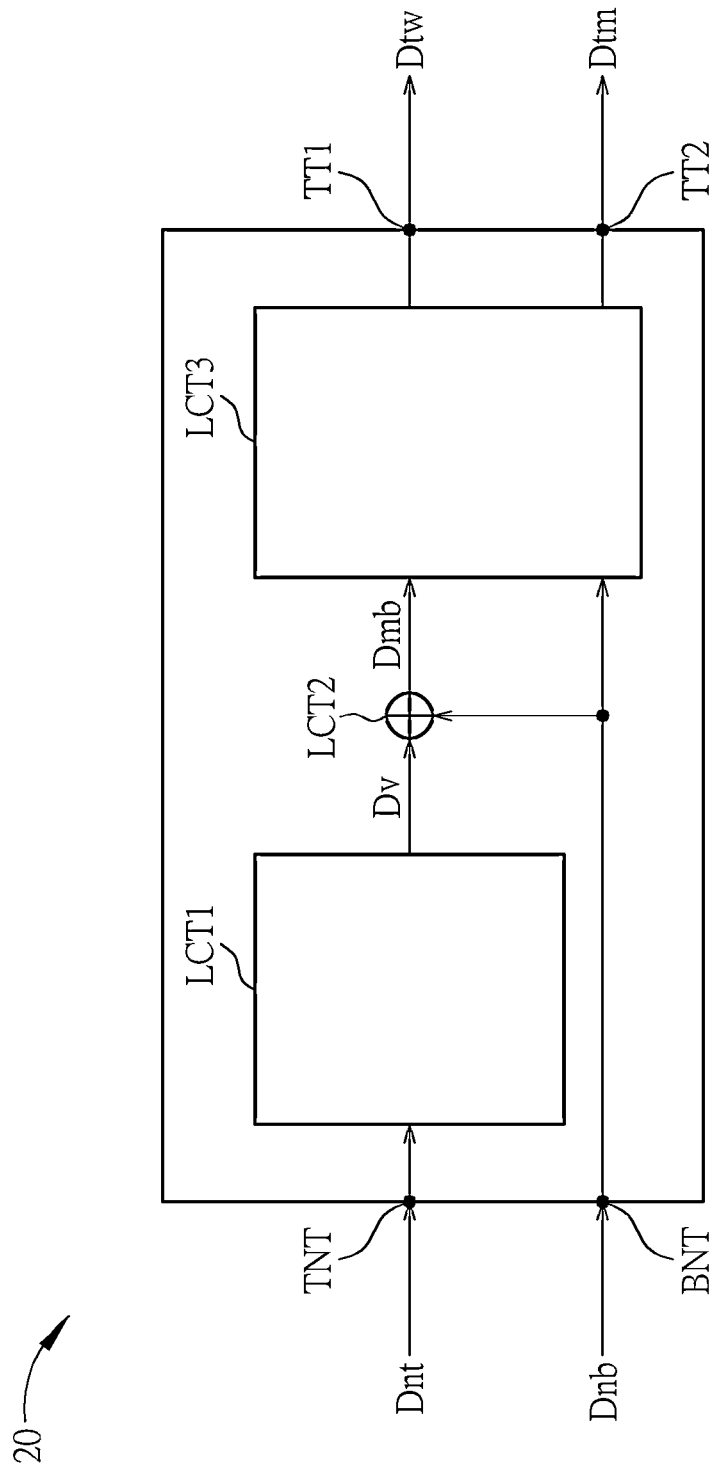
FIG. 2 is a schematic diagram of a substitute box according to an embodiment of the present invention.

Please refer to FIG. 2. FIG. 2 is a schematic diagram of a substitute box 20 according to an embodiment of the present invention. The substitute box 20 may perform a reversible substitution or a nonlinear substitution, but is not limited thereto. The substitute box 20 includes a target input terminal TNT, an obfuscation input terminal BNT, output terminals TT1, TT2, and logic circuits LCT1 to LCT3. The logic circuit LCT1 (also referred to as first logic circuit), which is configured to perform an inverse operation on a target input data Dnt to generate an inversion data Dv, is coupled to the target input terminal TNT, which is configured to receive the target input data Dnt. The logic circuit LCT2 (also referred to as second logic circuit), which is configured to combine the inversion data Dv with an obfuscation input data Dnb into a combination data Dmb, is coupled to the logic circuit LCT1 and the obfuscation input terminal BNT, which is configured to receive the obfuscation input data Dnb unrelated to a plaintext. The logic circuit LCT3 (also referred to as third logic circuit), which is configured to perform an affine operation on the obfuscation input data Dnb and the combination data Dmb to generate output data Dtw and Dtm, is coupled to the logic circuit LCT2 and the obfuscation input terminal BNT. The output data Dtw (also referred to as first output data) is sent out through the output terminal TT1 (also referred to as first output terminal); the output data Dtm (also referred to as second output data) associated with the output data Dtw is sent out through the output terminal TT2 (also referred to as second output data).

Briefly, the obfuscation input data Dnb is randomly generated from a random number generation circuit (not shown), and thus unrelated to a plaintext or an encryption key. The plaintext is unencrypted information before encryption or after decryption using the encryption key. On the other hand, the target input data Dnt is associated with the plaintext or the encryption key. The output data Dtw and Dtm are generated according to both the target input data Dnb and the obfuscation input data Dnb. Consequently, the output data Dtw is associated with the plaintext or the encryption key, and so is the output data Dtm. The output data Dtw and Dtm are however randomized because of the obfuscation input data Dnb. As a result, power consumption varies for protection against side channel attacks.

Specifically, the obfuscation input data Dnb of randomness is transmitted into the logic circuit LCT3. The randomness means that the obfuscation input data Dnb is time variant and unpredictable with respect to time. In some embodiments, the logic circuit LCT2 may involve bitwise exclusive operation, but is not limited thereto. In some embodiments, the logic circuit LCT2 may perform logical operation and implement an "exclusive OR" operation, an "OR" operation, a "NOR" operation, a "NAND" operation, or an "AND" operation, such that the randomness remains. In other words, the combination data Dmb sent into the logic circuit LCT3 is randomized since the obfuscation input data Dnb is mixed in. The obfuscation input data Dnb of randomness is used to perform secret sharing during the affine operation in the logic circuit LCT3. The advantage of using secret sharing is to ensure that the two output data Dtw and Dtm of the substitute box 20 would not be fixed under the same input pattern of the target input data Dnt, meaning that power consumption would be different. This breaks the correlation between power consumption and the encryption key, while an attacker attempts to repeat measurements. For example, when the target input data Dnt is f12186f9, the obfuscation input data Dnb, the output data Dtw, and the output data Dtm may be 33220757, 2ffc5831, f69e6888 respectively. Alternatively, when the target input data Dnt is still f12186f9, the obfuscation input data Dnb, the output data Dtw, and the output data Dtm may become 907127fa, 1dcdfa10, 2ff60603 respectively. In such a situation, power consumption of the substitute box 20 differs or fluctuates even if the target input data Dnt is unchanged, thereby resisting side channel attacks. However, the substitution belongs to one-to-one mapping. Whenever the target input data Dnt and the obfuscation input data Dnb are f12186f9 and 33220757 respectively, the output data Dtw and the output data Dtm are 2ffc5831 and f69e6888 respectively.

Besides, in some embodiments, the inverse operation is performed according to Galois Field. In some embodiments, the inverse operation of the logic circuit LCT1 may be distinct from a conventional one for protection against side channel attacks. For example, a generator polynomial of the inverse operation differs from $x^8+x^7+x^6+x^5+x^4+x^2+1$. The coefficients of the generator polynomial may be appropriately adjusted according to different system requirements. In some embodiments, the generator polynomial may affect the complexity of the logic circuit LCT1. In some embodiments, the generator polynomial may determine an inverse mapping matrix or an inverse lookup table. In some embodiments, the inverse may be found by calculation. In some embodiments, for the reason that finding the inverse is the most complicated finite field operation and that clock frequency cannot be set too high and would affect hardware throughput, an inverse lookup table is built in the logic circuit LCT1 to achieve high clock frequency. Correspondingly, the affine operation performed by the logic circuit LCT3 is adapted to the inverse operation of the logic circuit LCT1 so as to provide the output data Dtw and Dtm as expected. In some embodiments, the inverse lookup table and the affine operation are unique so as to resist side channel attacks.

In some embodiments, the number of bits (also referred to as bit number) in the target input data Dnt may be the same as that in the obfuscation input data Dnb, that in the output data Dtw, or that in the output data Dtm. In some embodiments, a number of bits in the target input data Dnt, a number of bits in the obfuscation input data Dnb, a number of bits in the output data Dtw and a number of bits in the output data Dtm are equal. In some embodiments, the target input data Dnt may be of 8 bits (namely, an 8-bit characters, or a byte), and so are the obfuscation input data Dnb, the output data Dtw, and the output data Dtm. That is to say, the substitute box 20 may take in two 8-bit inputs and produce two 8-bit outputs. In some embodiments, the target input data Dnt is associated with an encryption key, a plaintext, round key data, round function data, or a key constant. Likewise, the output data Dtw or Dtm associated with an encryption key, a plaintext, round key data, round function data, or a key constant. In some embodiments, the target input data Dnt is associated with a plaintext or an encryption key. Likewise, the output data Dtw or Dtm associated with a plaintext or an encryption key. There is a relation between the output data Dtw and Dtm so as to perform encryption processes as expected. That is to say, with the output data Dtw and Dtm, a ciphertext to be generated meets expectations.

In the embodiment as shown in FIG. 2, there are merely two input data (namely, the target input data Dnt and the obfuscation input data Dnb) and two input terminals (namely, the target input terminal TNT and the obfuscation input terminal BNT); in another embodiment, the number of input data (and thus the number of input terminals) may be more than two. In the embodiment as shown in FIG. 2, there are merely two output data Dtw, Dtm and two output terminals TT1, TT2; in another embodiment, the number of output data (and thus the number of output terminals) may be more than two.

Please refer to FIG. 3. FIG. 3 is a schematic diagram of an apparatus 30 according to an embodiment of the present invention. The apparatus 30 providing cipher functionality may serve as an encryptor. The apparatus 30 includes substitute boxes SB31 to SB34. In some embodiments, each of the substitute boxes SB31 to SB34 may be implemented as the substitute box 20 shown in FIG. 2.

Briefly, to resist side channel attacks, an inverse operation in any of the substitute boxes SB31 to SB34 may be different from the others. Correspondingly, an affine operation in any of the substitute boxes SB31 to SB34 may be different from the others. In other words, none of the substitute boxes SB31 to SB34 is identical to another one as the inverse operation and the affine operation may affect the complexity or circuit structure of one substitute box. The power consumed by the substitute boxes SB31 to SB34 differs, thereby achieving protection against side channel attacks.

For instance, the inverse operation (also referred to first inverse operation) or the affine operation (also referred to first affine operation) of the substitute box SB31 (also referred to first substitute box) differs from the inverse operation (also referred to second inverse operation) or the affine operation (also referred to second affine operation) of the substitute box SB32 (also referred to second substitute box). The generator polynomial (also referred to first generator polynomial) of the inverse operation of the substitute box SB31 may not be the same as the generator polynomial (also referred to second generator polynomial) of the substitute box SB32. In some embodiments, an inverse lookup table of the inverse operation of the substitute box SB31 may not be the same as those of the substitute boxes SB32 to SB34. In this manner, even if four target input data Dnt31 to Dnt34 transmitted to the substitute boxes SB31 to SB34 are identical, power consumption varies from one substitute box to another for protection against side channel attacks. Moreover, variation in the substitute boxes SB31 to SB34 of the apparatus 30 renders successful side channel attacks more difficult because it is laborious to analyze power consumption of (each of) the substitute boxes SB31 to SB34.

Besides, in some embodiments, the inverse operations of the substitute boxes SB31 to SB34 are performed according to Galois Field. In some embodiments, the inverse operations of the substitute boxes SB31 to SB34 may be distinct from a conventional one for protection against side channel attacks. For example, in some embodiments, generator polynomials of the substitute boxes SB31 to SB34 are different from $x^8+x^7+x^6+x^5+x^4+x^2+1$. In some embodiments, a generator polynomial of the inverse operation of one of the substitute boxes SB31 to SB34 may be expressed as $x^8+x^7+x^6+x^5+x^4+x^2+1$, while the others are distinct from $x^8+x^7+x^6+x^5+x^4+x^2+1$. The coefficients of the generator polynomials may be appropriately adjusted according to different system requirements. In some embodiments, each of the generator polynomials may determine an inverse mapping matrix or an inverse lookup table. In some embodiments, the inverse may be obtained by calculation. In some embodiments, for the reason that finding the inverse is the most complicated finite field operation and that clock frequency cannot be set too high and would affect hardware throughput, an inverse lookup table is built in each of the substitute boxes SB31 to SB34 to achieve high clock frequency. Correspondingly, the affine operations performed by the substitute boxes SB31 to SB34 are adapted to the inverse operations of the substitute boxes SB31 to SB34. In some embodiments, the inverse lookup tables and the affine operations are unique so as to resist side channel attacks.

More specifically, the target input data Dnt31 (also referred to as first target input data) transmitted to the substitute box SB31 is subject to the inverse operation of the substitute box SB31. After the inverse operation, the affine operation of the substitute box SB31 is performed on the target input data Dnt31 and an obfuscation input data Dnb31. Subsequently, output data Dtw31 and Dtm31 are generated and sent from the substitute box SB31. Therefore, power consumption of the substitute box SB31 fluctuates even if the target input data Dnt31 is unchanged, thereby resisting side channel attacks. Similarly, after the inverse operation of the substitute box SB32 subject to the target input data Dnt32 (also referred to as second target input data), the affine operation of the substitute box SB32 is performed on the target input data Dnt32 and an obfuscation input data Dnb32 to produce output data Dtw32 and Dtm32. After the inverse operation of the substitute box SB33 subject to the target input data Dnt33 (also referred to as third target input data), the affine operation of the substitute box SB33 is performed on the target input data Dnt33 and an obfuscation input data Dnb33 to produce output data Dtw33 and Dtm33. After the inverse operation of the substitute box SB34 subject to the target input data Dnt34 (also referred to as fourth target input data), the affine operation of the substitute box SB34 is performed on the target input data Dnt34 and an obfuscation input data Dnb34 to produce output data Dtw34 and Dtm34. This can resist side channel attacks effectively.

In some embodiments, the number of bits in any of the target input data Dnt31 to Dnt34, the number of bits in any of the obfuscation input data Dnb31 to Dnb34, the number of bits in any of the output data Dtw31 to Dtw34 and Dtm31 to Dtm34 may be the same. In some embodiments, each of the target input data Dnt31 to Dnt34, the obfuscation input data Dnb31 to Dnb34, the output data Dtw31 to Dtw34 and Dtm31 to Dtm34 may be of 8 bits. In some embodiments, each of the target input data Dnt31 to Dnt34, the output data Dtw31 to Dtw34 and Dtm31 to Dtm34 is associated with an encryption key, a plaintext, round key data, round function data, or a key constant. To perform encryption processes as expected, there is a relation between the output data Dtw31 and Dtm31. Likewise, there is a relation between the output data Dtw32 and Dtm32, between the output data Dtw33 and Dtm33, or between the output data Dtw34 and Dtm34.

It is noteworthy that the apparatus 30 shown in FIG. 3 is an exemplary embodiment of the present invention, and those skilled in the art may readily make alternations and modifications. For example, please refer to FIG. 4. FIG. 4 is a schematic diagram of an apparatus 40 according to an embodiment of the present invention. The apparatus 40 shown in FIG. 4 is similar to the apparatus 30 shown in FIG. 3. Therefore, the same numerals and notations denote the same components in the following description, and the similar parts are not detailed redundantly. Distinct from the apparatus 30, the apparatus 40 further includes a reordering circuit RDR and a recovery circuit RVR. The substitute boxes SB31 to SB34 are coupled between the reordering circuit RDR and the recovery circuit RVR respectively.

Briefly, to resist side channel attacks, the reordering circuit RDR may randomly allocate the four target input data Dnt31 to Dnt34 to the substitute boxes SB31 to SB34. As a result, power consumption varies for protection against side channel attacks, even though an input data Dps (also referred to as composite input data) is unchanged.

Specifically, the input data Dps is divided into the four target input data Dnt31 to Dnt34 in sequence. In other words, it follows the sequence: the target input data Dnt31 first, then the target input data Dnt32, then the target input data Dnt33, and then the target input data Dnt34. The four target input data Dnt31 to Dnt34 are reordered in a different random sequence by the reordering circuit RDR afterwards. With the reordering circuit RDR, a target input data (for instance, the target input data Dnt31) of the input data Dps would not be transmitted into certain substitute box (for instance, the substitute box SB31) for all time. Instead, sometimes a target input data (for instance, the target input data Dnt31) of the input data Dps is delivered to a substitute box (for instance, the substitute box SB33), but the target input data may be transmitted into another substitute box (for instance, the substitute box SB32) on occasions.

For example, as shown in FIG. 4, the target input data Dnt31 is transmitted to the substitute box SB31; the target input data Dnt32 is transmitted to the substitute box SB32; the target input data Dnt33 is transmitted to the substitute box SB33; the target input data Dnt34 is transmitted to the substitute box SB34. Alternatively, the target input data Dnt31 is transmitted to the substitute box SB33; the target input data Dnt32 is transmitted to the substitute box SB32; the target input data Dnt33 is transmitted to the substitute box SB34; the target input data Dnt34 is transmitted to the substitute box SB31. In this manner, the power consumed by the substitute boxes SB31 to SB34 changes at all times, thereby achieving protection against side channel attacks.

The reordering circuit RDR is configured to reorder the four target input data Dnt31 to Dnt34 and assign the four target input data Dnt31 to Dnt34 to the four substitute boxes SB31 to SB34. Correspondingly, the recovery circuit RVR is configured to recover the effect caused by the reordering circuit RDR, such that a ciphertext to be generated meets expectations. The target input data Dnt31 to Dnt34 ordered in a first sequence are reordered in a second sequence by the reordering circuit RDR. Correspondingly, the output data Dtw31 to Dtw34 ordered in the second sequence are reordered in the first sequence by the recovery circuit RVR; the output data Dtm31 to Dtm34 ordered in the second sequence are reordered in the first sequence by the recovery circuit RVR. In some embodiments, the reordering circuit RDR is executed in response to an indicator dct5. Similarly, the recovery circuit RVR is executed in response to an indicator dct6. The indicators dct5 and dct6 may be identical. In some embodiments, the indicator dct5 or dct6 may be random bits. In some embodiments, the indicator dct5 or dct6 may be of 5 bits.

Figure 5:
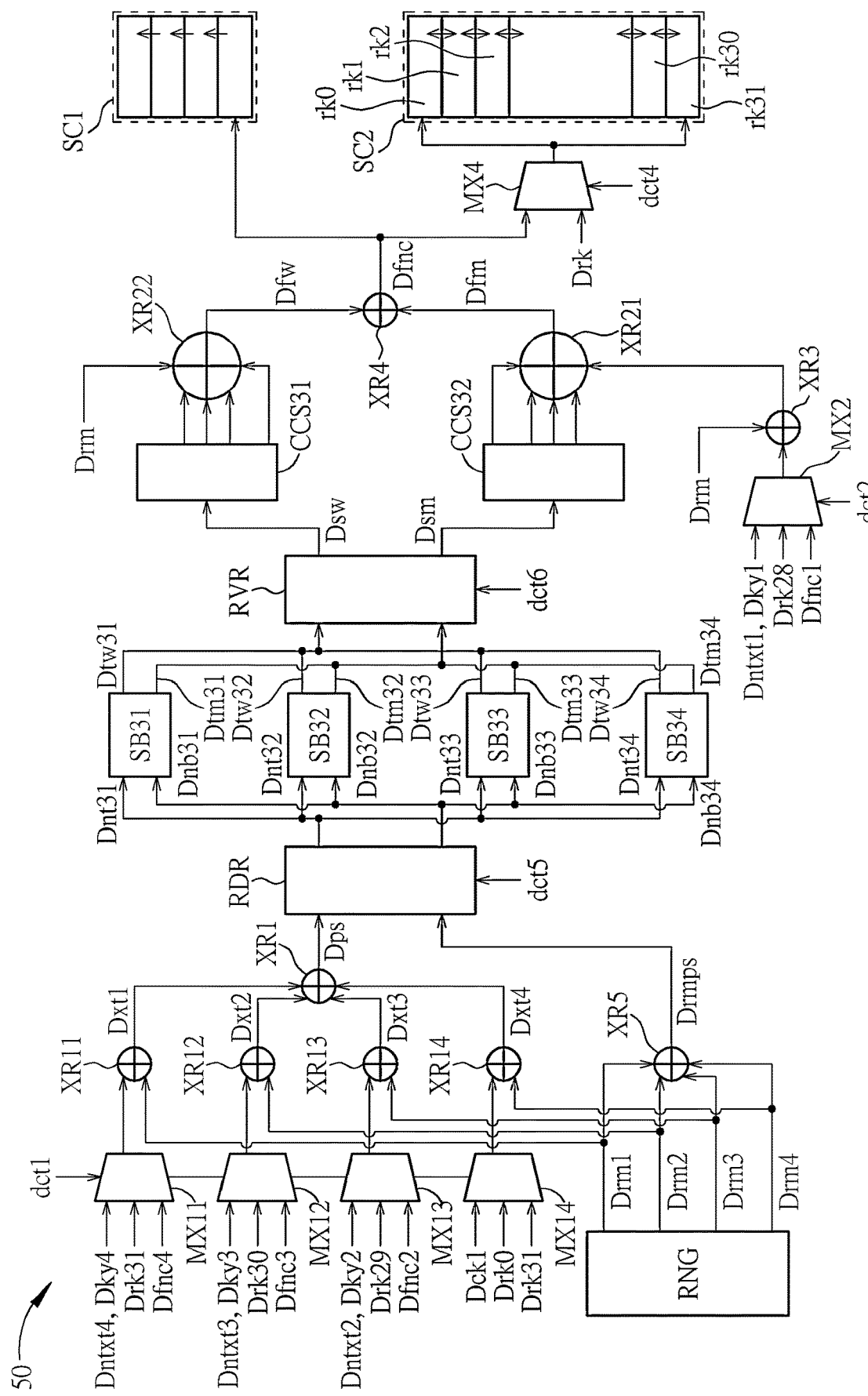

Please refer to FIG. 5. FIG. 5 is a schematic diagram of an apparatus 50 according to an embodiment of the present invention. The apparatus 50 shown in FIG. 5 is similar to the apparatus 40 shown in FIG. 4. Therefore, the same numerals and notations denote the same components in the following description, and the similar parts are not detailed redundantly. Distinct from the apparatus 40, the apparatus 50 further includes a random number generation circuit RNG, multiplexers MX11 to MX14, MX2, MX4, logical operation circuits XR11 to XR14, XR1 to XR4, shift circuits CCS31, CCS32, and storage circuits SC1, SC2.

Briefly, before divided into the four target input data Dnt31 to Dnt34, the input data Dps is randomized because of random data Drm1 to Drm4. In such a situation, power consumption changes, thereby resisting side channel attacks.

Specifically, single-round-iterative architecture is adopted in the apparatus 50. In some embodiments, the apparatus 50 may receive a plaintext and produce a ciphertext with an encryption key. The plaintext is unencrypted information before encryption or after decryption using the encryption key. The ciphertext is the result of encryption performed on the plaintext, and is unreadable without the proper key to decrypt it. In some embodiments, each of the plaintext, the ciphertext, and the encryption key of the apparatus 50 is of 128 bits. In some embodiments, the plaintext may be divided into input text data Dntxt1 to Dntxt4; the encryption key may be divided into encryption key data Dky1 to Dky4. Similarly, the ciphertext may include four output text data, which constitute the ciphertext. In some embodiments, each of the input text data Dntxt1 to Dntxt4 and the encryption key data Dky1 to Dky4 is of 32 bits (namely, a 32-bit word).

Once the encryption key is given, there are also 32 rounds of round key data generations to be performed for key expansion. Once the plaintext and the encryption key are given, there are 32 rounds of encryption round exchanges to be performed for encryption. In each round of algorithm of the apparatus 50, the apparatus 50 may perform an SBOX function with the substitute boxes SB31 to SB34, a position shift function with the shift circuits CCS31, CCS32, a logical operation function with the logical operation circuits XR11 to XR14, XR1 to XR4. When execution of the functions is complete, one round is completed.

In each round of algorithm of the apparatus 50, a round function data Dfnc is produced. After 32 rounds, there would be 32 round function data—namely, a round function data Dfnc1 serving as the first round function data, a round function data Dfnc2 serving as the second round function data, a round function data Dfnc3 serving as the third round function data, a round function data Dfnc4 serving as the fourth round function data, . . . , and the 32th round function data. In some embodiments, the round function data Dfnc may serve as one of round key data Drk0 to Drk31 (which may be collected by the multiplexer MX4 and stored in the storage circuit SC2), one of the four output text data, or a round function data. In some embodiments, each of the 32 round function data, the four output text data and the round key data Drk0 to Drk31 is of 32 bits. In other words, 128-bit data is inputted to output 32-bit data at a time, which is referred to as one round (exchange).

In each round of algorithm of the apparatus 50, the multiplexers MX11 to MX14, MX2, and MX4 are configured to select between a plurality input signals and forward it to a single output line. Take a transmission of the round key data Drk0 to the multiplexer MX14 as an example. As shown in FIG. 5, the multiplexer MX2 may choose the input text data Dntxt1 from the input text data Dntxt1, another round key data (for instance, the round key data Drk28), and a round function data (for instance, the round function data Dfnc1). The multiplexer MX11 may choose the input text data Dntxt4 from the input text data Dntxt4, still another round key data (for instance, the round key data Drk31), and another round function data (for instance, the round function data Dfnc4). The multiplexer MX12 may choose the input text data Dntxt3 from the input text data Dntxt3, still another round key data (for instance, the round key data Drk30), and still another round function data (for instance, the round function data Dfnc3). The multiplexer MX13 may choose the input text data Dntxt2 from the input text data Dntxt2, still another round key data (for instance, the round key data Drk29), and still another round function data (for instance, the round function data Dfnc2). The multiplexer MX14 may choose the round key data Drk0 from still another round key data (for instance, the round key data Drk0), still another round key data (for instance, the round key data Drk31), and a constant key data (for instance, the constant key data Dck1). In this case, the round function data Dfnc generated from the logical operation circuit XR4 merely serves as a round function data.

Take a transmission of the round key data Drk31 to the multiplexer MX14 as an example. The multiplexer MX2 may choose a round function data (namely, the 28th round function data) from an input text data, a round key data, and the round function data. The multiplexer MX11 may choose another round function data (namely, the 31th round function data) from another input text data, another round key data, and the round function data. The multiplexer MX12 may choose still another round function data (namely, the 30th round function data) from still another input text data, still another round key data, and the round function data. The multiplexer MX13 may choose still another round function data (namely, the 29th round function data) from still another input text data, still another round key data, and the round function data. The multiplexer MX14 may choose the round key data Drk31 from the round key data, still another round key data, and a constant key data. In this case, the round function data Dfnc generated from the logical operation circuit XR4 may serve as one of the four output text data.

Take a transmission of the constant key data Dck1 (also referred to as the first constant key data of 32 constant key data) to the multiplexer MX14 as an example. As shown in FIG. 5, the multiplexer MX2 may choose the encryption key data Dky1 from the encryption key data Dky1, a round key data (for instance, the round key data Drk28), and a round function data (for instance, the round function data Dfnc1). The multiplexer MX11 may choose the encryption key data Dky4 from the encryption key data Dky4, another round key data (for instance, the round key data Drk31), and another round function data (for instance, the round function data Dfnc4). The multiplexer MX12 may choose the encryption key data Dky3 from the encryption key data Dky3, still another round key data (for instance, the round key data Drk30), and still another round function data (for instance, the round function data Dfnc3). The multiplexer MX13 may choose the encryption key data Dky2 from the encryption key data Dky2, still another round key data (for instance, the round key data Drk29), and still another round function data (for instance, the round function data Dfnc2). The multiplexer MX14 may choose the constant key data Dck1 from still another round key data (for instance, the round key data Drk0), still another round key data (for instance, the round key data Drk31), and the constant key data Dck1. In this case, the round function data Dfnc generated from the logical operation circuit XR4 serves as a round key data (namely, the round key data Drk0).

Take a transmission of the 32th constant key data of the 32 constant key data to the multiplexer MX14 as an example. The multiplexer MX2 may choose a round key data (namely, the round key data Drk27) from an encryption key data, the round key data, and a round function data. The multiplexer MX11 may choose another round key data (namely, the round key data Drk30) from another encryption key data, the round key data, and another round function data. The multiplexer MX12 may choose still another round key data (namely, the round key data Drk29) from still another encryption key data, the round key data, and still another round function data. The multiplexer MX13 may choose still another round key data (namely, the round key data Drk28) from still another encryption key data, the round key data, and still another round function data. The multiplexer MX14 may choose the constant key data Dck32 from still another round key data, still another round key data, and the constant key data Dck32. In this case, the round function data Dfnc generated from the logical operation circuit XR4 may serve as a round key data (namely, the round key data Drk31).

As set forth above, the four output text data may be derived from the round key data Drk0 to Drk 31 and the input text data Dntxt1 to Dntxt4; the round key data Drk0 to Drk 31 may be derived from the encryption key. Besides, in terms of algorithm, the 32 rounds of round key data generations for key expansion is similar to the 32 rounds of encryption round exchanges for encryption. It will be appreciated that the input signals are chosen to provide a reduction in circuitry by means of the multiplexers MX11 to MX14, MX2, and MX4 without any architecturally visible changes being required to the apparatus 50. In some embodiments, each of the multiplexers MX11 to MX14, MX2, and MX4 is executed in response to an indicator (for example, indicators dct1, dct2, dct4). In some embodiments, the indicator s dct1, dct2, or dct4 may be associated a counter or a current state.

Then, the output of the multiplexer MX11 and the random data Drm1 are merged into a mixture data Dxt1 at the logical operation XR11, which is configured to combine the output of the multiplexer MX11 with the random data Drm1. Similarly, the output of the multiplexer MX12 and the random data Drm2 are merged into a mixture data Dxt2 at the logical operation XR12. The output of the multiplexer MX13 and the random data Drm3 are merged into a mixture data Dxt3 at the logical operation XR13. The output of the multiplexer MX14 and the random data Drm4 are merged into a mixture data Dxt4 at the logical operation XR14. Each of the random data Drm1 to Drm4 is randomly generated from the random number generation circuit RNG respectively, and thus unrelated to a plaintext or an encryption key in order to resist side channel attacks. The random number generation circuit RNG may use an integer counter.

The logical operation XR1 then combines the mixture data Dxt1 to Dxt4, such that the mixture data Dxt1 to Dxt4 are merged into an input data Dps at the logical operation XR1. In some embodiments, each of the mixture data Dxt1 to Dxt4 and the input data Dps is of 32 bits. In some embodiments, each of the logical operations XR11 to XR14, and XR1 may involve bitwise exclusive operation, but is not limited thereto. In some embodiments, each of the logical operations XR11 to XR14 may perform logical operation and implement an "exclusive or" operation, an "or" operation, a "nor" operation, a "nand" operation, or an "and" operation, such that the randomness remains. The input data Dps is generated according to the outputs of the multiplexers MX11 to MX14, and hence associated with the plaintext or the encryption key. Before divided into the four target input data Dnt31 to Dnt34, the input data Dps is however randomized because of the random data Drm1 to Drm4. As a result, power consumption varies for protection against side channel attacks.

The random data Drm1 to Drm4 are merged into a composite random data Drmps at the logical operation XR5. As the input data Dps is divided into the four target input data Dnt31 to Dnt34 in sequence, the composite random data Drmps is divided into the four obfuscation input data Dnb31 to Dnb33 in sequence. In some embodiments, the composite random data Drmps and the input data Dps are sent to the reordering circuit RDR as shown in FIG. 5. The reordering circuit RDR randomly allocates the four obfuscation input data Dnb31 to Dnb33 to the substitute boxes SB31 to SB34; meanwhile, the reordering circuit RDR randomly assigns the four target input data Dnt31 to Dnt34 to the substitute boxes SB31 to SB34. In some embodiments, the assigning of the four target input data Dnt31 to Dnt34 acts individually and independently of the allocation of the four obfuscation input data Dnb31 to Dnb33. In some embodiments, the reordering circuit RDR merely receives the input data Dps, and the four obfuscation input data Dnb31 to Dnb33 are directly transmitted to the substitute boxes SB31 to SB34 without randomly allocation by the reordering circuit RDR.

Subsequently, the apparatus 50 may perform an SBOX function with the substitute boxes SB31 to SB34 as the substitute box 20. There are two inputs for each of the substitute boxes SB31 to SB34; the outputs of each of the substitute boxes SB31 to SB34 are two shares. After the order of the output data Dtw31 to Dtw34 are changed by the recovery circuit RVR, the output data Dtw31 to Dtw34 are assembled into a substitution data Dsw. Corresponding, after the order of the output data Dtm31 to Dtm34 are changed by the recovery circuit RVR, the output data Dtm31 to Dtm34 are assembled into a substitution data Dsm. In some embodiments, the substitution data Dsw or Dsm may be of 32 bits. There is a relation between the substitution data Dsw and Dsm so as to perform encryption processes as expected. That is to say, with the substitution data Dsw and Dsm, a ciphertext to be generated can meet expectations.

Because the outputs of each of the substitute boxes SB31 to SB34 are two shares, it requires two shift circuits CCS31 and CCS32 to calculate the two shares individually and independently. The substitution data Dsw is sent to the shift circuit CCS31; the substitution data Dsm is sent to the shift circuit CCS32. In some embodiments, each of the shift circuits CCS31 and CCS32 may perform a reversible linear substitution. In some embodiments, each of the shift circuits CCS31 and CCS32 may involve a particular substitution function. The particular substitution function may be L' transformation for key expansion and may be L transformation for encryption. For the L' transformation or the L transformation, secret sharing is adopted to achieve the effect of resisting side channel attacks. In some embodiments, the shift circuit CCS31 or CCS32 XR1 may involve the position shift function. The position shift function may involve a cyclic shift with n bit(s) shifted left (or right), where n is a positive integer, but is not limited thereto. In some embodiments, the circuit structure of the shift circuit CCS31 is identical to that of the shift circuit CCS32. In some embodiments, the shift circuits CCS31 and CCS32 may be implemented as a shift circuit CCS shown in FIG. 1. The exact circuit structure of the shift circuit CCS31 or CCS32 may be appropriately adjusted according to different system requirements.

The outputs of the shift circuit CCS31 and a random data Drm (for example, the random data Drm4) are merged into a shift data Dfw at the logical operation XR4, which is configured to combine the output of the shift circuit CCS31 with the random data Drm. The output of the multiplexer MX2 and a random data Drm (for example, the random data Drm4) are merged at the logical operation XR3 so as to perform encryption processes as expected. The output of the shift circuit CCS32 and the output of the logical operation XR3 are merged into a shift data Dfm at the logical operation XR21, which is configured to combine the output of the shift circuit CCS32 with the output of the logical operation XR3. When the shift data Dfw and Dfm are blended at the logical operation XR4, the round function data Dfnc is produced. In some embodiments, each of the logical operations XR21, XR22, XR3, and XR4 may involve bitwise exclusive operation, but is not limited thereto. In some embodiments, each of the logical operations XR21, XR22, XR3, and XR4 may perform logical operation and implement an "exclusive or" operation, an "or" operation, a "nor" operation, a "nand" operation, or an "and" operation, such that the randomness remains for protection against side channel attacks.

The round function data Dfnc (for example, the round function data Dfnc4) currently produced may be stored together with three other round function data (for example, the round function data Dfnc1 to Dfnc3) generated in the three previous successive rounds in the storage circuit SC1 or SC2. The round function data Dfnc (for example, the round function data Dfnc4 or the round key data Drk31) currently produced may be supplied to one of the multiplexers MX11 to MX13, and MX2 (for example, the multiplexer MX11) for the next consecutive round; the three other round function data generated in the three previous successive rounds may be supplied to the others of the multiplexers MX11 to Ml3, and MX2 for the next consecutive round. In some embodiments, the storage circuit SC1 may serve as a round function output register, and the storage circuit SC2 may serve as a round key register for the round key data Drk0 to Drk31. In the first round, the round key data Drk0 may be saved in the 32th position of the storage circuit SC2. In the second round, the round key data Drk0 may be moved to the 31th position of the storage circuit SC2, and the round key data Drk1 may be saved in the 32th position of the storage circuit SC2. After 32 rounds, all the round key data Drk0 to Drk31 would stay at the corresponding position. The shift register design makes the encryption and decryption process easier to control, because when the two operations are performed, it just need to shift the round key data by different direction. Therefore, the round key data may be read correctly at the same register, and multiplexer area may be reduced. Moreover, encryption, decryption or key expansion uses the same hardware resource. The shift register design saves around 4 k gate count if the shift register design is compared with a lookup table version.

It will be appreciated that encryption and decryption methods in the SM4 algorithm employ similar mechanism, except that the order is reversed. An apparatus for decryption may thus be adapted to the apparatus 50 for encryption. Nevertheless, a conventional decryptor is also feasible to decrypt the ciphertext generated by the apparatus 50.

Please refer to Table 1. Table 1 presents logic synthesis results of the apparatus 50. In Table 1, a Synopsys design compiler is utilized to synthesize the apparatus 50. The technology process for the apparatus 50 may be TSMC 22 nm. The throughput is determined by the maximum clock frequency and the number of operation cycles. According to Table 1, the throughput of the apparatus 50 is 2 gigabit per second (Gbps), and the apparatus 50 may be operated at 500 Mega Hertz (MHZ). In the apparatus 50, hardware resources required for encryption, decryption and key expansion are highly integrated. If compared to other apparatus, there is 17.7% area reduction.

TABLE 1

| Item | Key | Cycles | Frequency (MHz) | Throughput (Mbps) | Gate Count (K) |
|---|---|---|---|---|---|
| (without) | unchanged | 32 | 500 | 2000 | 12.56 |
| (without) | changed | 64 | 500 | 1000 | 12.56 |
| (with) | unchanged | 32 | 500 | 2000 | 15.19 |
| (with) | changed | 64 | 500 | 1000 | 15.19 |

In some embodiments, Sakura-G is adopted to measure one million power traces. Sakura-G is a development board specifically designed for hardware implementation for side channel security. It is characterized by a clean environment and less noise. Sakura-G includes a main field programmable gate array (FPGA) and a control FPGA. The main FPGA is built for the implementation of the encryption algorithm. The register transfer language (RTL) design of the present invention may be put on the main FPGA. The control FPGA is mainly responsible for communicating with the main FPGA. For instance, the control FPGA controls the input of the main FPGA, when an analog-to-digital converter (ADC) starts to record power trace.

Please refer to Table 2. Table 2 presents conditions of correlation power analysis (CPA) experiment. The clock frequency of the Sakura-G board is 3.5 MHZ. ADC sampling rate is 78.6 mega-samples per second (MSa/s). This means that the ADC can record about 23 points every cycle. In some embodiments, the round key data of the first round is attacked. The model used is hamming distance model and the correct round key data is 32'hab0d48a0. During the CPA, the round key data is divided into four sub keys, and each of the four sub keys is of 8 bits.

TABLE 2

| | |
|---|---|
| Frequency of Sakura-G board | 3.5 MHZ |
| ADC sampling rate | 78.6 MSa/s |
| Sample points | 1000 |
| Attack point | encryption first round |
| round key data | 32'hab0d48a0 |

Figure 6:
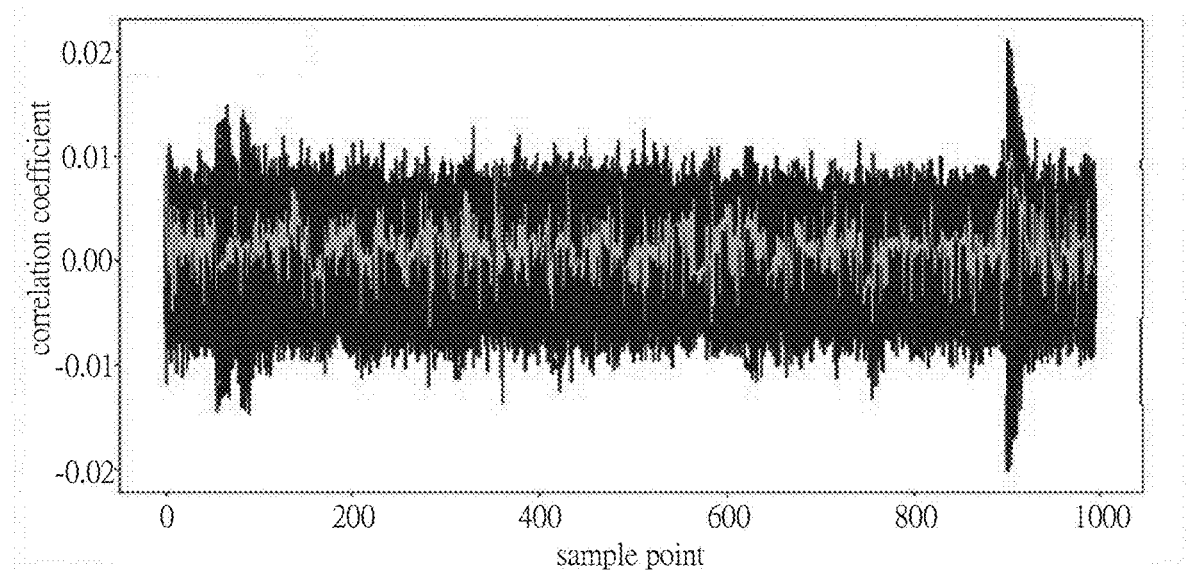
FIG. 6 is a schematic diagram of results of correlation power analysis with one sub key under one million power traces according to an embodiment of the present invention.

Please refer to FIG. 6. FIG. 6 is a schematic diagram of results of the CPA with one of the four sub keys under one million power traces according to an embodiment of the present invention. In FIG. 6, dark color presents the wrong guesses to the sub key, while light color presents the correct guesses to the sub key. According to FIG. 6, the highest correlation coefficient of all sample points is not in the range of sample points around 100, which is set to attack. Comparing the correlation of the correct guesses with the correlation of the wrong guesses, the correlation of the correct guesses is not higher than that of the wrong guesses at all the sample points. Therefore, the apparatus 50 is able to eliminate the correlation between power consumption and the correct sub key, thereby resisting side channel attacks.

Figure 7:
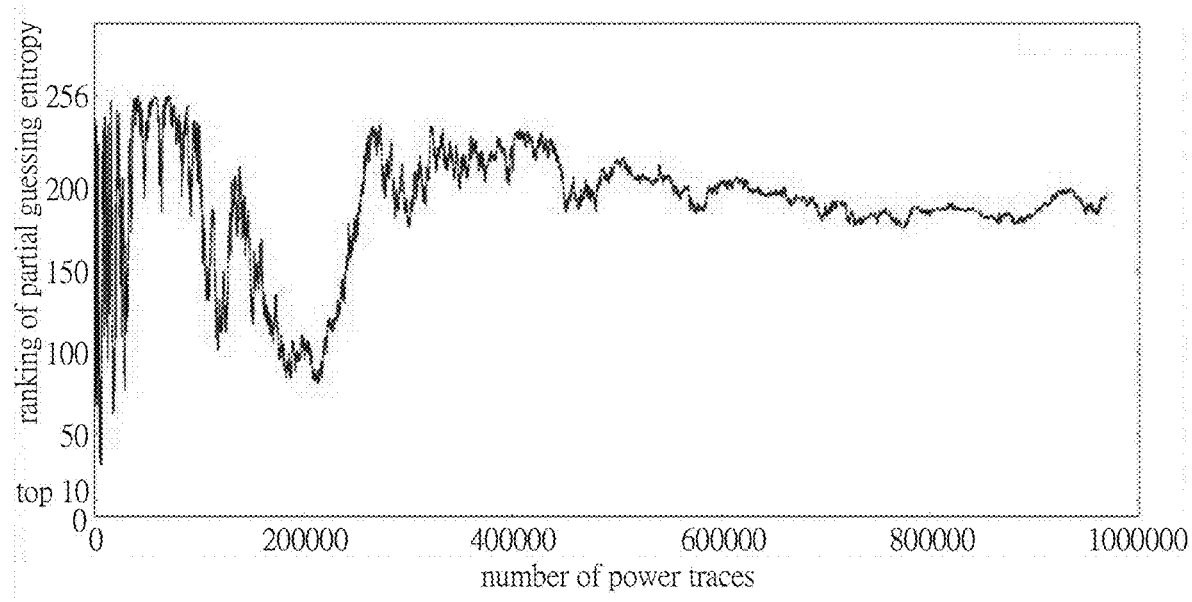
FIG. 7 is a schematic diagram of partial guessing entropy of one sub key according to an embodiment of the present invention.

Please refer to FIG. 7. FIG. 7 is a schematic diagram of partial guessing entropy (PGE) of one of the four sub keys according to an embodiment of the present invention. PGE may indicate where the correct sub key is ranked under the current number of power traces. The lower the ranking, the stronger its correlation with the power traces. According to FIG. 7, the PGE of the sub key does not get lower as the power trace increases, meaning that the correlation between the power traces and the correct sub key is low. As a result, the apparatus 50 is secure even when one million power traces are collected.

Figure 1:
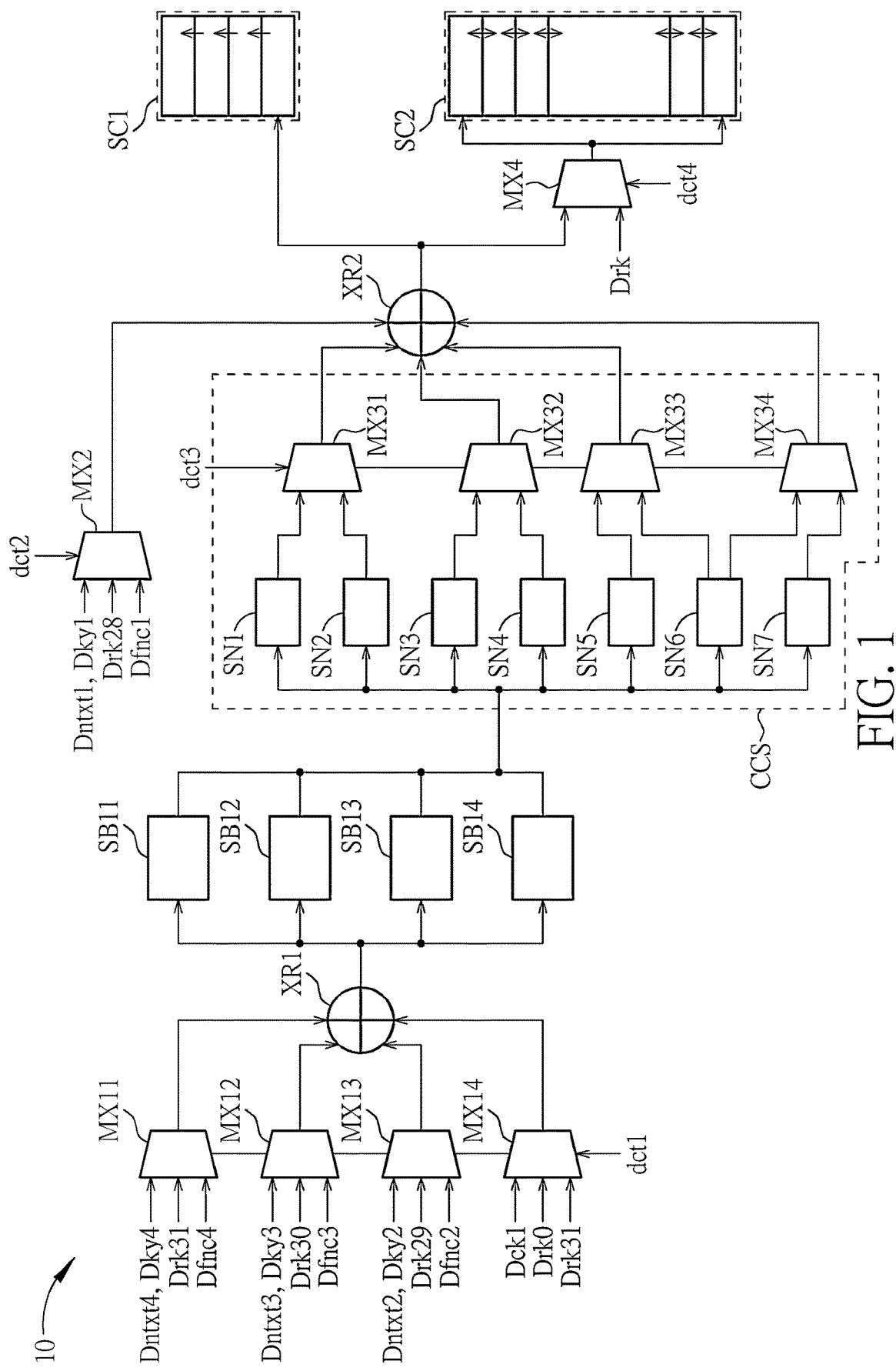
FIG. 1 is a schematic diagram of an apparatus according to an embodiment of the present invention.

In some embodiments, most side channel attack countermeasures are done in a substitute box, meaning that the architecture is quite similar to that shown in FIG. 1 while the structure of the substitute box is different. However, as shown in FIG. 5, from the beginning of the apparatus 50 on the far left, through the substitute boxes SB31 to SB34, to the last part of the L transformation (or the L' transformation) of the apparatus 50 on the far right, the apparatus 50 is able to resist side channel attacks.

Please refer to FIG. 1. FIG. 1 is a schematic diagram of an apparatus 10 according to an embodiment of the present invention. The apparatus 10 shown in FIG. 1 is similar to the apparatus 50 shown in FIG. 5. Therefore, the same numerals and notations denote the same components in the following description, and the similar parts are not detailed redundantly. Distinct from the apparatus 50, the apparatus 10 merely includes substitute boxes SB11 to SB14, the multiplexers MX11 to MX14, MX2, MX4, the logical operation circuits XR1, XR2, the shift circuit CCS, and the storage circuits SC1, SC2. Four 32-bit data outputted from the multiplexers MX11 to MX14 are exclusive or together at the logical operation circuit XR1. The 32-bit output of the logical operation circuit XR1 is split into four groups of 8 bits and entered into the four substitute boxes SB11 to SB14. The output of the substitute boxes SB11 to SB14 are merged into 32 bits for an L transformation or L' transformation at the shift circuit CCS and the logical operation circuit XR2. The outputs of the shift circuit CCS3 and the multiplexer MX2 are merged at the logical operation XR2. The multiplexer MX4 may choose one from the output of the logical operation XR2 and a round key data Drk, and then the chosen one may be stored in the storage circuit SC2.

The shift circuit CCS may include multiplexers MX31 to MX34 and shift units SN1 to SN6. The apparatus 10 may perform a position shift function with the shift circuit CCS. The position shift function may involve a cyclic shift with n bit(s) shifted left (or right), where n is a positive integer, but is not limited thereto. For example, the shift unit SN1 may involve a cyclic shift with 2 bits shifted left. Likewise, the shift units SN2 to SN7 may involve cyclic shifts with 13 bits, 10 bits, 23 bits, 18 bits, 0 bits and 24 bits shifted left. In the case of cyclic shift with 0 bits shifted left, the shift unit SN6 may be omitted in some embodiments. The multiplexer MX31 may choose one from the outputs of the shift units SN1 and SN2. Similarly, the multiplexers MX32 to MX34 may choose one from the outputs of the shift units SN3, SN4, the outputs of the shift units SN5, SN6, and the outputs of the shift units SN6, SN7. In other words, the shift circuit CCS may perform a reversible linear substitution. The shift circuit CCS may involve a particular substitution function. The particular substitution function may be L' transformation for key expansion and may be L transformation for encryption.

In summary, random bits, in some embodiments, are introduced into a substitute box as noise. There is merely one input one-to-one mapping to one output of a substitute box. Nevertheless, the obfuscation input data is employed in of the present invention to complete secret sharing, such that the substitute box of the present invention take in one target input data and produce two output data. Even if the target input data is unchanged, the two output data may vary at random with respect to time. The variation of the inverse operation and the affine operation in each substitute box of the present invention renders successful side channel attacks more difficult because it is laborious to analyze power consumption of the substitute box.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A substitute box (Sbox), for implementing SM4 cipher, comprising:
   a first logic circuit, configured to perform an inverse operation on target input data to find inversion data of the target input data;
   a second logic circuit, configured to combine the inversion data with obfuscation input data to generate combination data, wherein the obfuscation input data is unrelated to a plaintext; and
   a third logic circuit, configured to perform an affine operation on the obfuscation input data and the combination data to convert the obfuscation input data and the combination data into first output data and second output data, wherein the second output data is associated with the first output data, and the first output data and the second output data are generated according to both the target input data and the obfuscation input data.

2. The substitute box of claim 1, wherein the inverse operation is performed according to Galois Field, wherein a generator polynomial of the inverse operation differs from $x^8+x^7+x^6+x^5+x^4+x^2+1$.

3. The substitute box of claim 1, wherein the obfuscation input data is randomly generated from a random number generation circuit.

4. The substitute box of claim 1, wherein the first output data and the second output data are randomized and associated with the plaintext or an encryption key.

5. The substitute box of claim 1, wherein a number of bits in the target input data, a number of bits in the obfuscation input data, a number of bits in the first output data and a number of bits in the second output data are equal.

6. The substitute box of claim 1, wherein the target input data is 8 bits, the obfuscation input data is 8 bits, the first output data is 8 bits, and the second output data is 8 bits.

7. An apparatus, for implementing SM4 cipher, comprising:
four substitute boxes, each of the four substitute boxes comprising:
a first logic circuit, configured to perform an inverse operation on one of four target input data to find inversion data of the target input data;
a second logic circuit, configured to combine the inversion data with one of four obfuscation input data to generate combination data, wherein the four obfuscation input data are unrelated to a plaintext; and
a third logic circuit, configured to perform an affine operation on the obfuscation input data and the combination data to convert the obfuscation input data and the combination data into one of four first output data and one of four second output data, wherein the first output data and the second output data are generated according to both the target input data and the obfuscation input data, and the second output data is associated with the first output data.

8. The apparatus of claim 7, wherein a first generator polynomial of a first substitute box of the four substitute boxes differs from a second generator polynomial of a second substitute box of the four substitute boxes.

9. The apparatus of claim 7, wherein a first inverse operation or a first affine operation of a first substitute box of the four substitute boxes differs from a second inverse operation or a second affine operation of a second substitute box of the four substitute boxes.

10. The apparatus of claim 7, further comprising:
a reordering circuit, coupled to the four substitute boxes, wherein an input data is divided into a first target input data, a second target input data, a third target input data, and a fourth target input data of the four target input data, wherein the reordering circuit is configured to reorder the four target input data and assign the four target input data to the four substitute boxes.

11. The apparatus of claim 10, wherein the input data is randomized before divided into the four target input data.

12. The apparatus of claim 10, further comprising:
a recovery circuit, coupled to the four substitute boxes, wherein the four target input data ordered in a first sequence are reordered in a second sequence by the reordering circuit, wherein the four first output data ordered in the second sequence are reordered in the first sequence by the recovery circuit, wherein the four second output data ordered in the second sequence are reordered in the first sequence by the recovery circuit.

13. The apparatus of claim 7, wherein the four obfuscation input data are randomly generated from a random number generation circuit.

14. The apparatus of claim 7, wherein the four first output data and the four second output data are randomized and associated with the plaintext or an encryption key.

15. A substitute method, for implementing SM4 cipher, comprising:
receiving one of four target input data and one of four obfuscation input data, wherein the four obfuscation input data are unrelated to a plaintext;
performing an inverse operation on the target input data to find inversion data of the target input data;
combining the inversion data with the obfuscation input data to generate combination data; and
performing an affine operation on the obfuscation input data and the combination data to convert the obfuscation input data and the combination data into one of four first output data and one of four second output data, wherein the first output data and the second output data are generated according to both the target input data and the obfuscation input data, and the second output data is associated with the first output data.

16. The substitute method of claim 15, further comprising:
performing, at a first logic circuit, the inverse operation on the target input data to generate the inversion data, wherein a generator polynomial of the inverse operation differs from $x^8+x^7+x^6+x^5+x^4+x^2+1$;
combining, at a second logic circuit coupled to the first logic circuit, the inversion data with the obfuscation input data to generate the combination data; and
performing, at a third logic circuit coupled to the second logic circuit, the affine operation on the obfuscation input data and the combination data to generate the first output data and the second output data.

17. The substitute method of claim 15, further comprising:
performing inverse operations on the four target input data to generate four inversion data respectively;
combining the four inversion data with the four obfuscation input data into four combination data respectively; and
performing affine operations on the four obfuscation input data and the four combination data to generate the four first output data and the four second output data respectively, wherein a first inverse operation or a first affine operation differs from a second inverse operation or a second affine operation.

18. The substitute method of claim 15, further comprising:
reordering the four target input data and assigning the four target input data to four substitute boxes.

19. The substitute method of claim 15, further comprising:
reordering the four target input data ordered in a first sequence in a second sequence;
reordering the four first output data ordered in the second sequence in the first sequence; and
reordering the four second output data ordered in the second sequence in the first sequence.

20. The substitute method of claim 15, wherein the four first output data and the four second output data are randomized and associated with the plaintext or an encryption key.

* * * * *